(12) United States Patent
Cao

(10) Patent No.: US 11,360,324 B2
(45) Date of Patent: Jun. 14, 2022

(54) ADJUSTABLE NOSE BRIDGE AND GLASSES HAVING SAME

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventor: Yan-Lei Cao, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 176 days.

(21) Appl. No.: 16/815,155

(22) Filed: Mar. 11, 2020

(65) Prior Publication Data

US 2021/0215951 A1 Jul. 15, 2021

(30) Foreign Application Priority Data

Jan. 13, 2020 (CN) .......................... 202010033182.8

(51) Int. Cl.
*G02C 5/12* (2006.01)
(52) U.S. Cl.
CPC ..................... *G02C 5/122* (2013.01)
(58) Field of Classification Search
CPC .......... G02C 5/122; G02C 5/12; G02C 5/126; G02C 5/124; G02C 2200/18; G02C 2200/08; G02C 3/003; G02C 5/04; G02C 1/06; G02C 1/10; G02C 2200/04; G02C 5/00; G02C 5/008; G02C 5/143; G02C 5/20; G02C 1/08; G02C 5/045; G02C 5/2263; G02C 11/00; G02C 11/08
See application file for complete search history.

(56) References Cited

U.S. PATENT DOCUMENTS

| | | | | |
|---|---|---|---|---|
| 2,020,629 | A * | 11/1935 | Alphuso | G02C 5/124 351/128 |
| 2,315,115 | A * | 3/1943 | Fischer | G02C 5/04 351/128 |
| 2,622,477 | A * | 12/1952 | Bechtel | G02C 5/124 351/55 |
| 2,856,813 | A * | 10/1958 | Kudelko | G02C 5/045 351/109 |
| 4,113,365 | A * | 9/1978 | Koketsu | G02C 5/124 351/128 |
| 4,762,407 | A * | 8/1988 | Anger | G02C 5/001 351/204 |
| 5,499,063 | A * | 3/1996 | Butler | A61B 3/04 351/41 |
| 5,971,538 | A * | 10/1999 | Heffner | G02C 5/124 351/137 |

(Continued)

*Primary Examiner* — William R Alexander
*Assistant Examiner* — Sharrief I Broome
(74) *Attorney, Agent, or Firm* — ScienBiziP, P.C.

(57) ABSTRACT

An adjustable nose bridge includes a mounting body and a nose bridge frame. The nose bridge frame includes a main body, an elastic member, and an adjusting member. Two ends of the elastic member respectively resiliently abut the main body and the mounting body. The adjusting member is telescopically coupled to the mounting body and fixes a position of the main body.

8 Claims, 4 Drawing Sheets

(56) References Cited

U.S. PATENT DOCUMENTS 6,010,215 A * 1/2000 Miceli ................. G02C 5/20
　　　　　　　　　　　　　　　　351/128
2011/0170053 A1* 7/2011 Jacquemin ............ G02C 5/126
　　　　　　　　　　　　　　　　351/137

* cited by examiner

ADJUSTABLE NOSE BRIDGE AND GLASSES HAVING SAME

FIELD

The subject matter herein generally relates to glasses, and more particularly to a pair of glasses having an adjustable nose bridge.

BACKGROUND

Each person has a different face shape. However, a structure of a pair of conventional glasses is fixed and cannot be adjusted to fit different face shapes.

BRIEF DESCRIPTION OF THE DRAWINGS

Implementations of the present disclosure will now be described, by way of embodiments, with reference to the attached figures.

DETAILED DESCRIPTION

Figure 1:
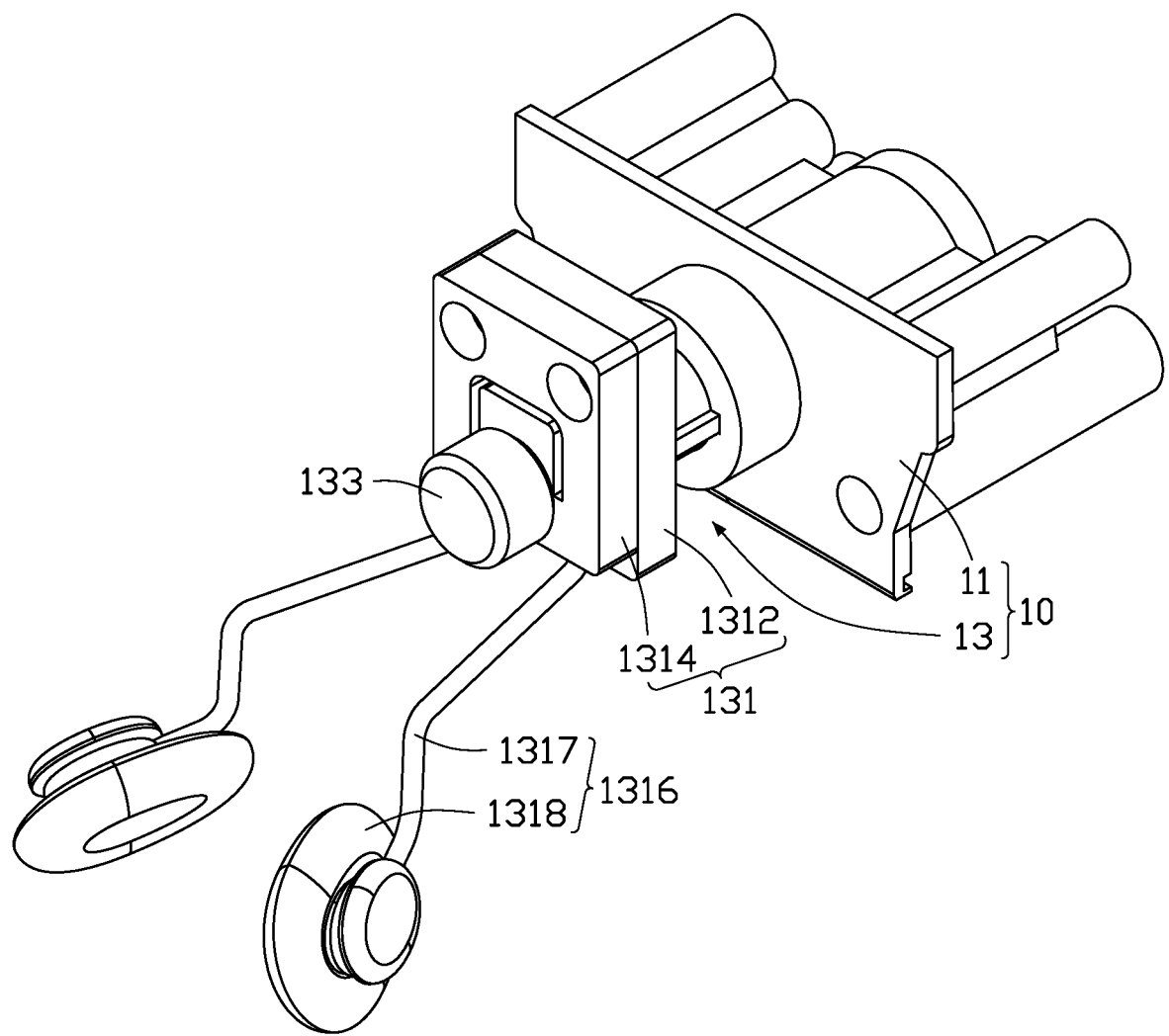
FIG. 1 is an assembled, isometric view of an embodiment of a pair of glasses having an adjustable nose bridge.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 shows an embodiment of a pair of glasses 100. The pair of glasses 100 may be nearsighted glasses, farsighted glasses, sunglasses, augmented reality (AR) glasses, or virtual reality (VR) glasses.

The pair of glasses 100 includes a spectacle frame 10. The spectacle frame 10 includes a mounting body 11 and a nose bridge frame 13. The nose bridge frame 13 is telescopically mounted on the mounting body 11. In the illustrated embodiment, only a portion of a structure of the mounting body 11 is shown. The mounting body 11 is used for mounting a lens or a display mechanism suitable for AR or VR.

Figure 2:
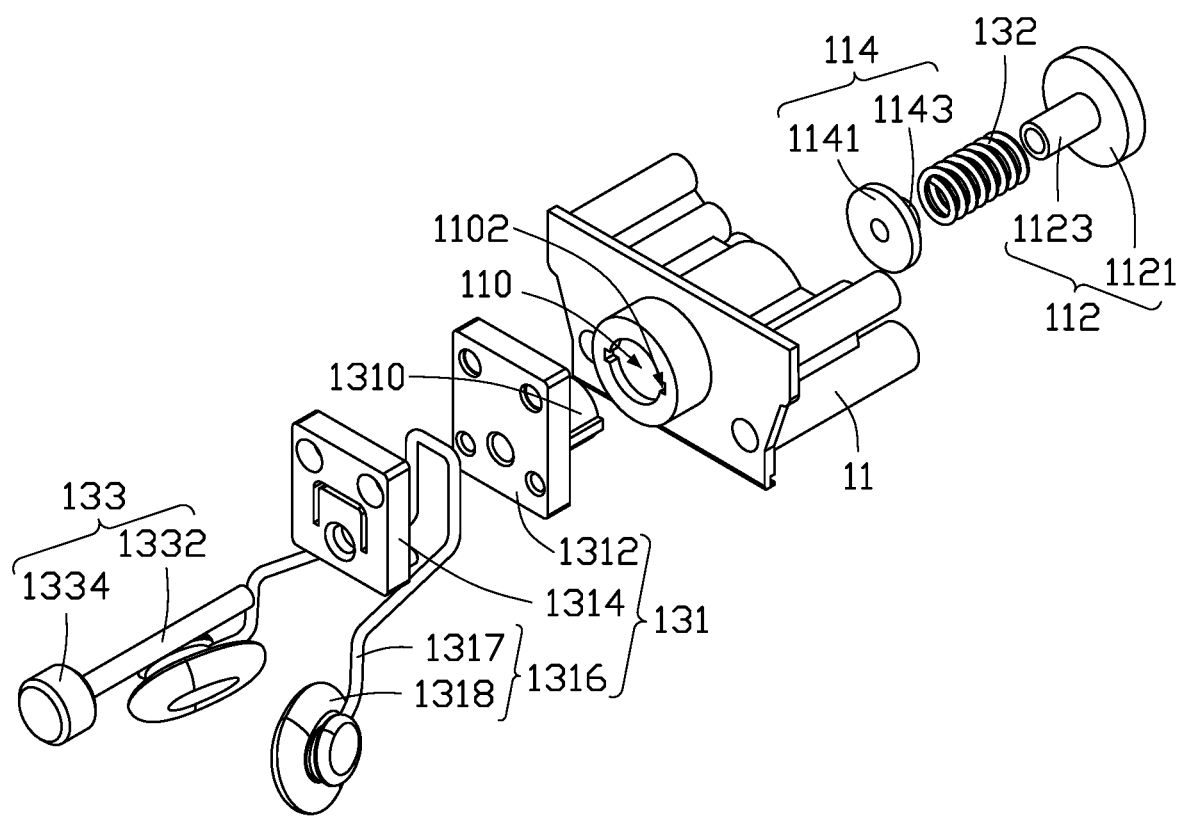
FIG. 2 is an exploded, isometric view of the pair of glasses in FIG. 1.
Figure 3:
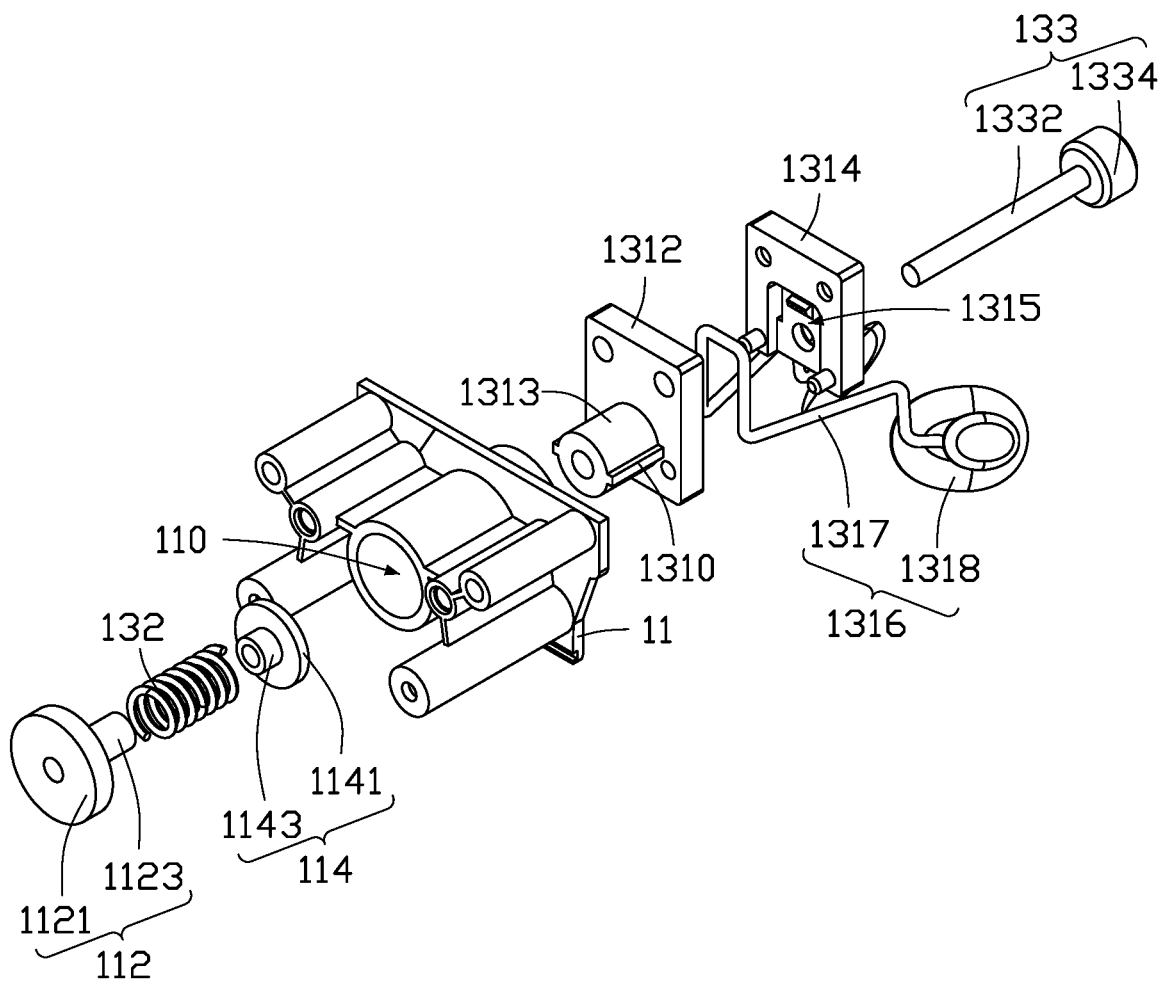
FIG. 3 is similar to FIG. 2, but shown from another angle.
Figure 4:
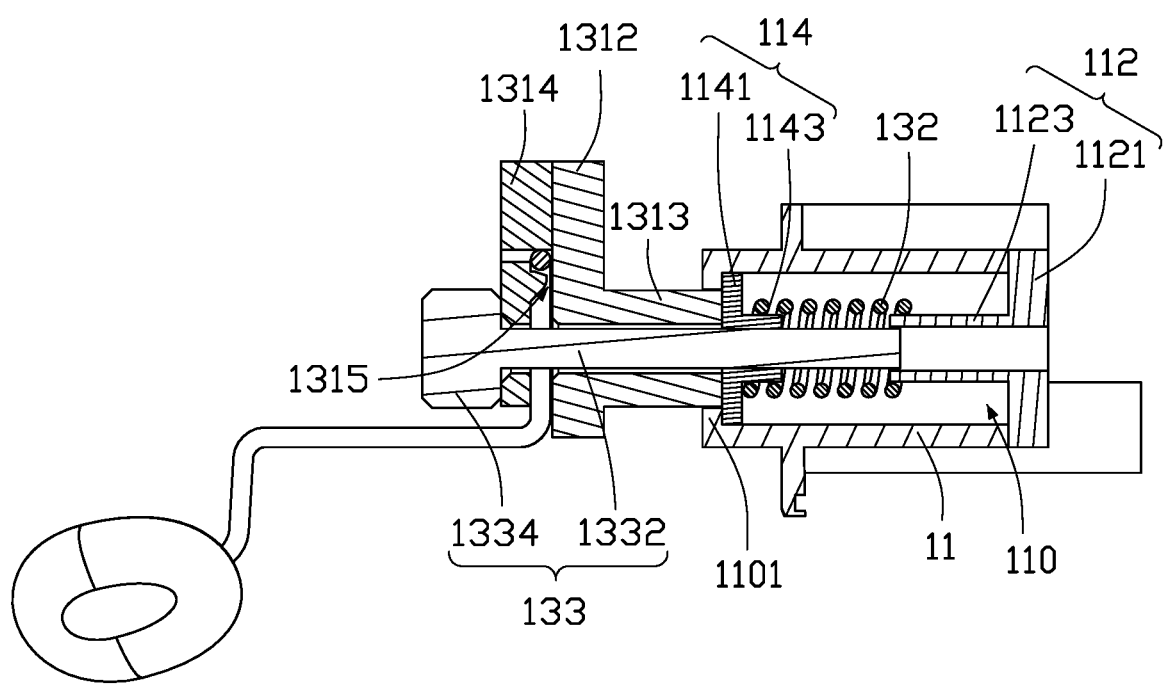
FIG. 4 is a cross-sectional view of FIG. 1.

Referring to FIGS. 2-4, the nose bridge frame 13 includes a main body 131, an elastic member 132, and an adjusting member 133. Two ends of the elastic member 132 elastically resist the main body 131 and the mounting body 11 respectively. The adjusting member 133 is telescopically connected to the mounting body 11 and fixes a position of the main body 131. The adjusting member 133 can move to adjust a distance between the main body 131 and the mounting body 11.

The adjusting member 133 includes a connecting portion 1332 and a limiting portion 1334. The limiting portion 1334 is located at one end of the connecting portion 1332. A width of the limiting portion 1334 is larger than a width of the connecting portion 1332. The connecting portion 1332 is telescopically connected to the mounting body 11. In the illustrated embodiment, a peripheral wall of the connection portion 1332 is provided with a thread for engaging with the mounting body 11. The limiting portion 1334 is located on a side of the main body 131 facing away from the mounting body 11. The limiting portion 1334 is configured to fix a position of the main body 131.

The main body 131 is biased by the elastic member 132 to abut against the limiting portion 1334. By rotating the adjusting member 133, a distance between the limiting portion 1334 and the mounting body 11 is changed, thereby driving the main body 131 to move away from or toward the mounting body 11.

The mounting body 11 defines a receiving hole 110. The mounting body 11 includes a first fixing member 112. The first fixing member 112 is received in the receiving hole 110. The first fixing member 112 is configured to engage with the thread of the connecting portion 1332.

In the illustrated embodiment, the receiving hole 110 is a through hole. The first fixing member 112 and the adjusting member 133 are respectively located at two ends of the receiving hole 110. The first fixing member 112 includes a first fixing portion 1121 and a first protruding portion 1123. The first fixing portion 1121 is located outside the receiving hole 110 and abuts a periphery of the receiving hole 110. The first protruding portion 1123 extends into the receiving hole 110.

The mounting body 11 further includes a second fixing member 114. The second fixing member 114 includes a second fixing portion 1141 and a second protruding portion 1143. One end of the elastic member 132 is sleeved on the first protruding portion 1123 and abuts against the first fixing portion 1121, and another end of the elastic member 132 is sleeved on the second protruding portion 1143 and abuts against a side of the second fixing portion 1141. Another side of the second fixing portion 1141 is in contact with the main body 131.

A flange 1101 is located on an inner side of the receiving hole 110 adjacent an opening of the receiving hole 110 facing the main body 131. The flange 1101 limits the second fixing portion 1141.

The main body 131 includes a first clamping member 1312, a second clamping member 1314, and a support member 1316. The first clamping member 1312 and the second clamping member 1314 cooperatively clamp the support member 1316. The adjusting member 133 extends through the first clamping member 1312 and the second clamping member 1314.

The first clamping member 1312 includes a protruding portion 1313. The protruding portion 1313 is slidably received in the receiving hole 110. An end of the protruding portion 1313 contacts the second fixing member 114 to act on or be pushed by the elastic member 132 through the second fixing member 114.

Protrusions 1310 extending along an axial direction of the protruding portion 1313 protrude from an outer peripheral wall of the protruding portion 1313. Grooves 1102 corresponding to the protrusions 1310 are defined in an inner wall of the receiving hole 110. The protrusions 1310 are slidably received in the grooves 1102. The grooves 1102 prevent rotation of the protrusions 1310.

A clamping groove 1315 is defined in a side of the second clamping member 1314 facing the first clamping member 1312. The support member 1316 is clamped in the clamping groove 1315 between the first clamping member 1312 and the second clamping member 1314.

The support member 1316 includes a bracket 1317 and two nose guards 1318. A middle portion of the bracket 1317 is clamped between the first clamping member 1312 and the second clamping member 1314. Each of two ends of the bracket 1317 is connected to a corresponding nose guard 1318.

The nose bridge frame 13 is telescopically mounted on the mounting body 11, so that the nose bridge frame 13 can be adjusted according to the needs of different users.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An adjustable nose bridge comprising:
a mounting body; and
a nose bridge frame; wherein:
the nose bridge frame comprises a main body, an elastic member, and an adjusting member;
two ends of the elastic member respectively resiliently abut the main body and the mounting body; and
the adjusting member is threadedly engaged with the mounting body and fixes a position of the main body;
the adjusting member comprises a connecting portion and a limiting portion;
the limiting portion is located on an end of the connecting portion;
the connecting portion is threadedly engaged with the mounting body;
the limiting portion fixes a position of the main body;
the mounting body defines a receiving hole;
the mounting body comprises a first fixing member received in the receiving hole; and
the first fixing member is threadedly engaged with the connecting portion; the first fixing member comprises a first fixing portion and a first protruding portion;
the mounting body further comprises a second fixing member;
the second fixing member comprises a second fixing portion and a second protruding portion;
one end of the elastic member is sleeved on the first protruding portion and abuts against the first fixing portion, and another end of the elastic member is sleeved on the second protruding portion and abuts against a side of second fixing portion;
another side of the second fixing portion is in contact with the main body;
the main body comprises a first clamping member, a second clamping member, and a support member;
the first clamping member and the second clamping member cooperatively clamp the support member;
the adjusting member passes through the first clamping member and the second clamping member;
the first clamping member comprises a protruding portion;
the protruding portion is slidably received in the receiving hole; and
an end of the protruding portion contacts the second fixing member to act on or be pushed by the elastic member through the second fixing member.

2. The adjustable nose bridge of claim 1, wherein:
an outer peripheral wall of the protruding portion comprises at least one protrusion;
at least one groove is defined in an inner wall of the receiving hole; and
each of the at least one protrusion is slidably received in a corresponding one of the at least one groove.

3. The adjustable nose bridge of claim 1, wherein:
a clamping groove is defined in a side of the second clamping member facing the first clamping member; and
the support member is clamped in the clamping groove between the first clamping member and the second clamping member.

4. The adjustable nose bridge of claim 3, wherein:
the support member comprises a bracket and two nose guards;
the bracket is clamped between the first clamping member and the second clamping member; and
each of two ends of the bracket is coupled to a corresponding one of the two nose guards.

5. A pair of glasses comprising an adjustable nose bridge, the adjustable nose bridge comprising:
a mounting body; and
a nose bridge frame; wherein:
the nose bridge frame comprises a main body, an elastic member, and an adjusting member;
two ends of the elastic member respectively resiliently abut the main body and the mounting body;
the adjusting member is threadedly engaged with the mounting body and fixes a position of the main body;
the adjusting member comprises a connecting portion and a limiting portion;
the limiting portion is on an end of the connecting portion;
the connecting portion is threadedly engaged with the mounting body;
the limiting portion fixes a position of the main body;
the mounting body defines a receiving hole;
the mounting body comprises a first fixing member received in the receiving hole;
the first fixing member is threadedly engaged with the connecting portion;
the first fixing member comprises a first fixing portion and a first protruding portion;
the mounting body further comprises a second fixing member;
the second fixing member comprises a second fixing portion and a second protruding portion;
one end of the elastic member is sleeved on the first protruding portion and abuts against the first fixing portion, and another end of the elastic member is sleeved on the second protruding portion and abuts against a side of second fixing portion;

another side of the second fixing portion is in contact with the main body;

the main body comprises a first clamping member, a second clamping member, and a support member;
the first clamping member and the second clamping member cooperatively clamp the support member;
the adjusting member passes through the first clamping member and the second clamping member;

the first clamping member comprises a protruding portion;

the protruding portion is slidably received in the receiving hole;

an end of the protruding portion contacts the second fixing member to act on or be pushed by the elastic member through the second fixing member.

6. The pair of glasses of claim 5, wherein:
an outer peripheral wall of the protruding portion comprises at least one protrusion;

at least one groove is defined in an inner wall of the receiving hole; and each of the at least one protrusion is slidably received in a corresponding one of the at least one groove.

7. The pair of glasses of claim 5, wherein:
a clamping groove is defined in a side of the second clamping member facing the first clamping member; and the support member is clamped in the clamping groove between the first clamping member and the second clamping member.

8. The pair of glasses of claim 7, wherein:
the support member comprises a bracket and two nose guards;

the bracket is clamped between the first clamping member and the second clamping member; and each of two ends of the bracket is coupled to a corresponding one of the two nose guards.

* * * * *